(12) United States Patent
Taneda et al.

(10) Patent No.: US 6,752,237 B2
(45) Date of Patent: Jun. 22, 2004

(54) REAR WHEEL STEERING APPARATUS

(75) Inventors: Akiya Taneda, Anjo (JP); Akira Kato, Anjo (JP); Takamichii Nakaishi, Toyota (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 10/140,072

(22) Filed: May 8, 2002

(65) Prior Publication Data
US 2002/0195294 A1 Dec. 26, 2002

(30) Foreign Application Priority Data
May 8, 2001 (JP) .......................................... 2001-137478

(51) Int. Cl.$^7$ ................................................. B62D 5/04
(52) U.S. Cl. .................................... 180/445; 180/446
(58) Field of Search ............................... 180/443–446, 180/412, 413

(56) References Cited

U.S. PATENT DOCUMENTS

| | | | | |
|---|---|---|---|---|
| 4,703,945 A | | 11/1987 | Kawamoto et al. .......... 280/445 |
| 4,869,335 A | * | 9/1989 | Takahashi .................... 180/412 |
| 5,007,494 A | * | 4/1991 | Ohmura et al. .............. 180/445 |
| 5,082,080 A | * | 1/1992 | Kanazawa et al. ........... 180/412 |
| 5,101,922 A | * | 4/1992 | Ohmura ....................... 180/445 |
| 5,330,023 A | * | 7/1994 | Miyashita et al. ........... 180/400 |
| 5,456,330 A | * | 10/1995 | Kojima et al. ............... 180/445 |
| 5,810,108 A | * | 9/1998 | Jung et al. ................... 180/404 |
| 6,371,239 B2 | * | 4/2002 | Furumi et al. ............... 180/445 |

* cited by examiner

Primary Examiner—Lesley D. Morris
Assistant Examiner—L. Lum
(74) Attorney, Agent, or Firm—Burns, Doane, Swecker & Mathis, L.L.P.

(57) ABSTRACT

A rear wheel steering apparatus comprises an electric motor generating rotational torque, an electric control device controlling the rotation of the electric motor, a motion converting device converting the rotational torque of the electric motor into a propulsion force, an output shaft outputting the propulsion force, a rear wheel steering angle detecting device detecting a steering angle of the rear wheels steered by the output shaft, a regulating member for prohibiting the output shaft from rotating while allowing the output shaft to move axially, a neutral return device manually returning the rear wheels to a neutral position upon failure of the motor or the electric control device, a neutral return detecting device for detecting the return of the output shaft to the neutral position and a neutral return notification device for notifying the return of the output shaft to the neutral position.

14 Claims, 6 Drawing Sheets

Fig. 6

REAR WHEEL STEERING APPARATUS

CROSS REFERENCE TO RELATED APPLICATIONS

This application is based on and claims priority under 35 U.S.C. §119 with respect to a Japanese Patent Application 2001-137478, filed on May 8, 2001, the entire content of which is incorporated herein by reference.

FIELD OF THE INVENTION

This invention relates to a rear wheel steering apparatus. More particularly, this invention relates to a rear wheel steering apparatus having a neutral return means for manually returning rear wheels to a neutral position in the case of the failure of an electric motor or an electric control device.

BACKGROUND OF THE INVENTION

A conventional rear wheel steering apparatus of this kind is disclosed in, for example, U.S. Pat. No. 4,703,945. This apparatus includes an electric motor, a rotational member rotated by the electric motor, a tie rod connecting member for converting a rotational movement of the rotation member into a movement in the direction of a width of the vehicle, a connecting member provided between the rotational member and the tie rod connecting member and able to be driven conversely by an external force from the rear wheels and an engage means provided on the rotational member and being engageable with a manual rotation means for manually giving a rotational movement to the rotational member.

In the above mentioned prior apparatus, in case it is possible to rotate a rotational shaft of the electric motor from outside, it is possible to rotate the rotational member by the manual rotation means and thereby the rear wheels can be returned to a neutral position. However, it must depend on intuition of an operator whether the rear wheels were returned to the neutral position or not. Therefore, it is necessary to repeat the running of the vehicle after the rotation of the manual rotation means in order to confirm the going straight ahead of the vehicle and the efficiency of the operation is low.

A need exists for a rear wheel steering apparatus which can return the rear wheels to the neutral position efficiently.

SUMMARY OF THE INVENTION

A rear wheel steering apparatus comprises an electric motor for generating a rotational torque, an electric control device for controlling the rotation of the electric motor, a motion converting means for converting the rotational torque of the electric motor into a propulsion force in the direction of a width of a vehicle and connected to a rotational shaft of the electric motor, an output shaft for outputting the propulsion force in the direction of the width of the vehicle which is converted by the motion converting means, tie rods connecting between the output shaft and rear wheels and having a ball joint, respectively, a housing fixed to the vehicle and accommodating the electric motor, the motion converting means and the output shaft therein, a rear wheel steering angle detecting means for detecting a steering angle of the rear wheels steered by the output shaft, a regulating member connected to the housing and for prohibiting the output shaft from rotating while allowing the output shaft to move in the axial direction, a neutral return means for manually returning the rear wheels to a neutral position in the case of the failure of the electric motor or the electric control device, a neutral return detecting means for detecting the return of the output shaft to the neutral position and a neutral return notification means for notifying the return of the output shaft to the neutral position.

BRIEF DESCRIPTION OF THE DRAWING FIGURES

A more complete appreciation of the invention and other advantages thereof will be readily obtained as the same becomes better understood by reference to the following detailed description when considered in connection with the accompanying drawings, in which.

DETAILED DESCRIPTION OF THE INVENTION

Having generally described the present invention, a further understanding of the invention can be obtained now according to embodiments of the present invention with reference to FIGS. 1 to 6 in the accompanying drawings.

Figure 1:
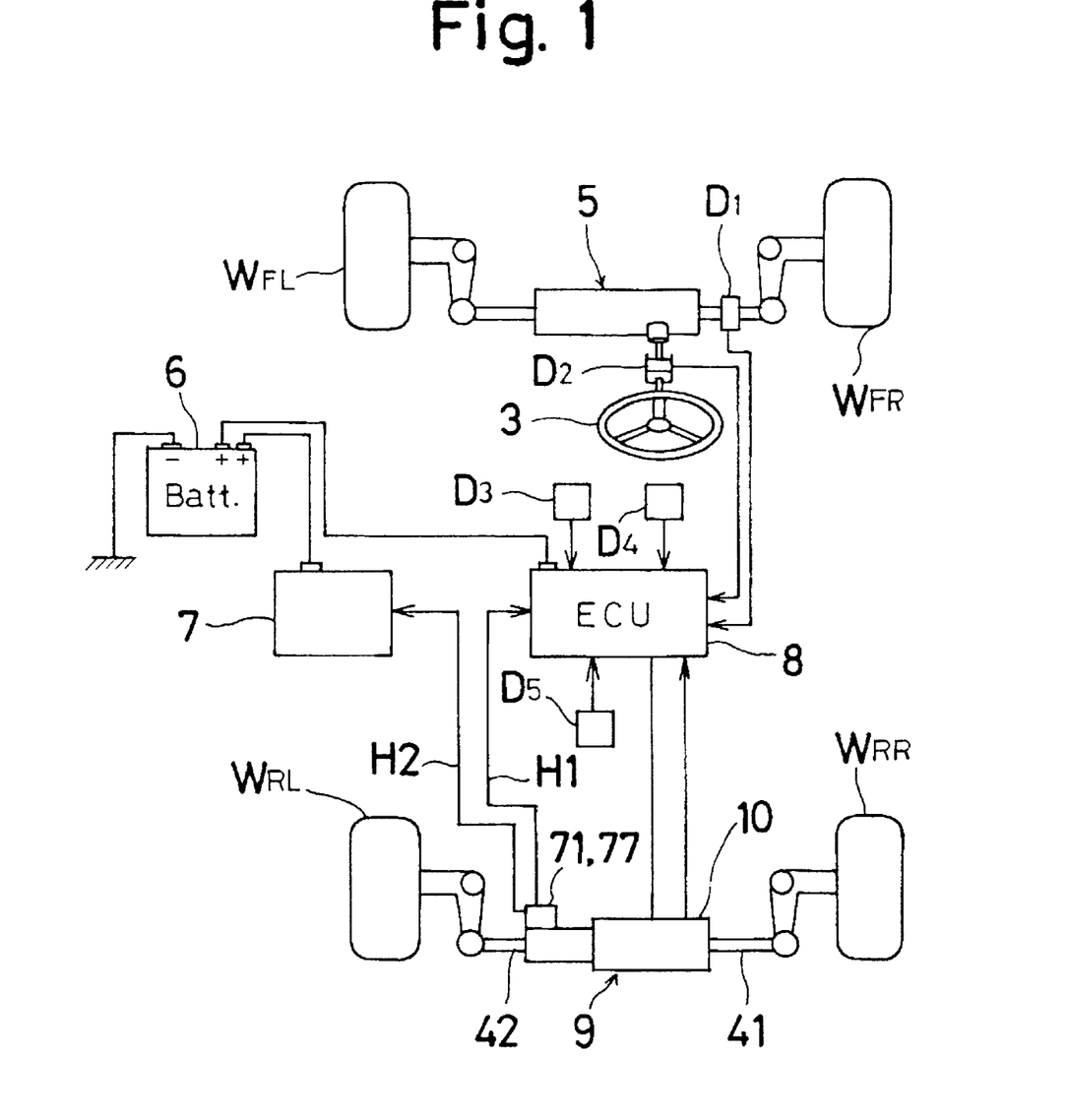
FIG. 1 is a schematic illustration of a steering system of a vehicle applied a first embodiment of a rear wheel steering apparatus in accordance with the present invention.

FIGS. 1 to 6 show a first embodiment. In FIG. 1, front wheels WFL and WFR are steered by a front wheel steering apparatus 5 in response to a rotational operation of a steering wheel 3. A steering angle of the front wheels EFL and WFR a re detected by a first front wheel steering angle sensor D1 detecting a moving amount of a rack of the front wheel steering device 5 and a second front wheel steering angle sensor D2 provided on a steering shaft.

Rear wheels WRL and WRR are steered by a rear wheel steering apparatus 9. The rear wheel steering apparatus 9 is driven by a brush-less motor 10. A magnetic pole sensor D6 which detects a rotational angle of the brush-less motor 10 is provided on an end portion of the brush-less motor 10. Further, a rear wheel steering angle sensor 71 which detects an actual steering angle of the rear wheels WRL and WRR is connected to a first rear wheel steering shaft 41 for steering the rear wheels WRL and WRR.

Further, in a steering system of a vehicle shown in FIG. 1, a first vehicular velocity sensor D3 and a second vehicular velocity sensor D4 which detect a velocity of the vehicle and a yaw rate sensor D5 which detects a yaw rate of the vehicle are provided.

Further, in the steering system of the vehicle, a neutral return notification device 7 including a neutral position return sensor 77 provided in a steering angle sensor portion 70 is provided. The neutral return notification device 7 is directly driven by a battery 6 without via an electric control device 8. Therefore, even if the failure of the electric control device 8 occurs, the operation of the neutral return notification device 7 is not affected.

The brush-less motor 10 is controlled by a signal from the electric control device 8. The electric control device 8 receives each of the sensor outputs from the first front wheel steering angle sensor D1, the second front wheel steering angle sensor D2, the first vehicular velocity sensor D3, the second vehicular velocity sensor D4, the yaw rate sensor D5, the magnetic pole sensor D6 and the rear wheel steering angle sensor 71 and calculates a required steering angle of the rear wheels WRL and WRR corresponding to the steering angle of the front wheels WFL and WFR and running conditions of the vehicle. The electric control device 8 drives a brush-less motor 10 50 that the required steering angle is realized.

Figure 2:
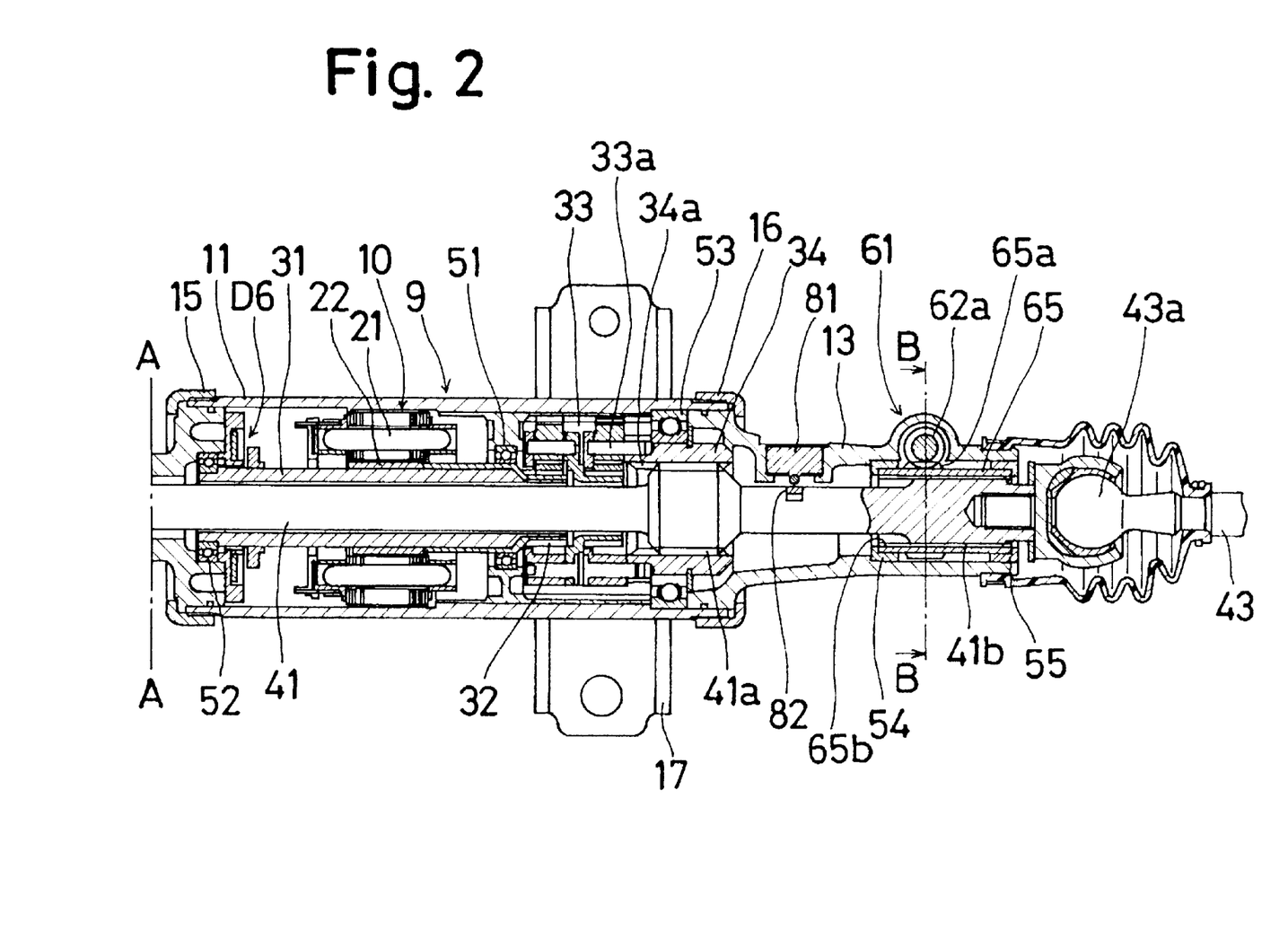
FIG. 2 is a cross sectional view of an essential portion of a first embodiment of the rear wheel steering apparatus in accordance with the present invention.
Figure 3:
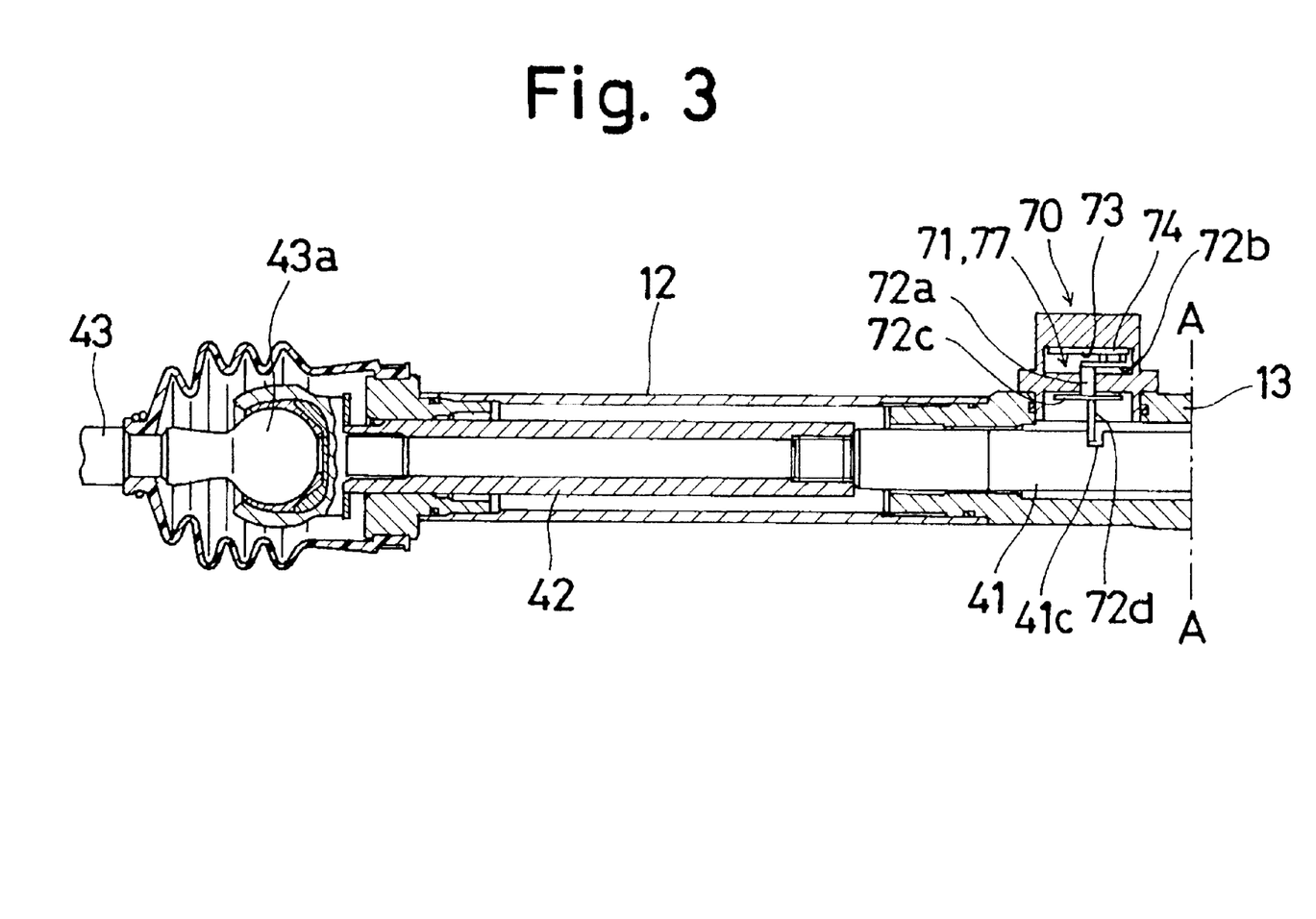
FIG. 3 is a cross sectional view of an essential portion of a first embodiment of the rear wheel steering apparatus in accordance with the present invention.
Figure 4:
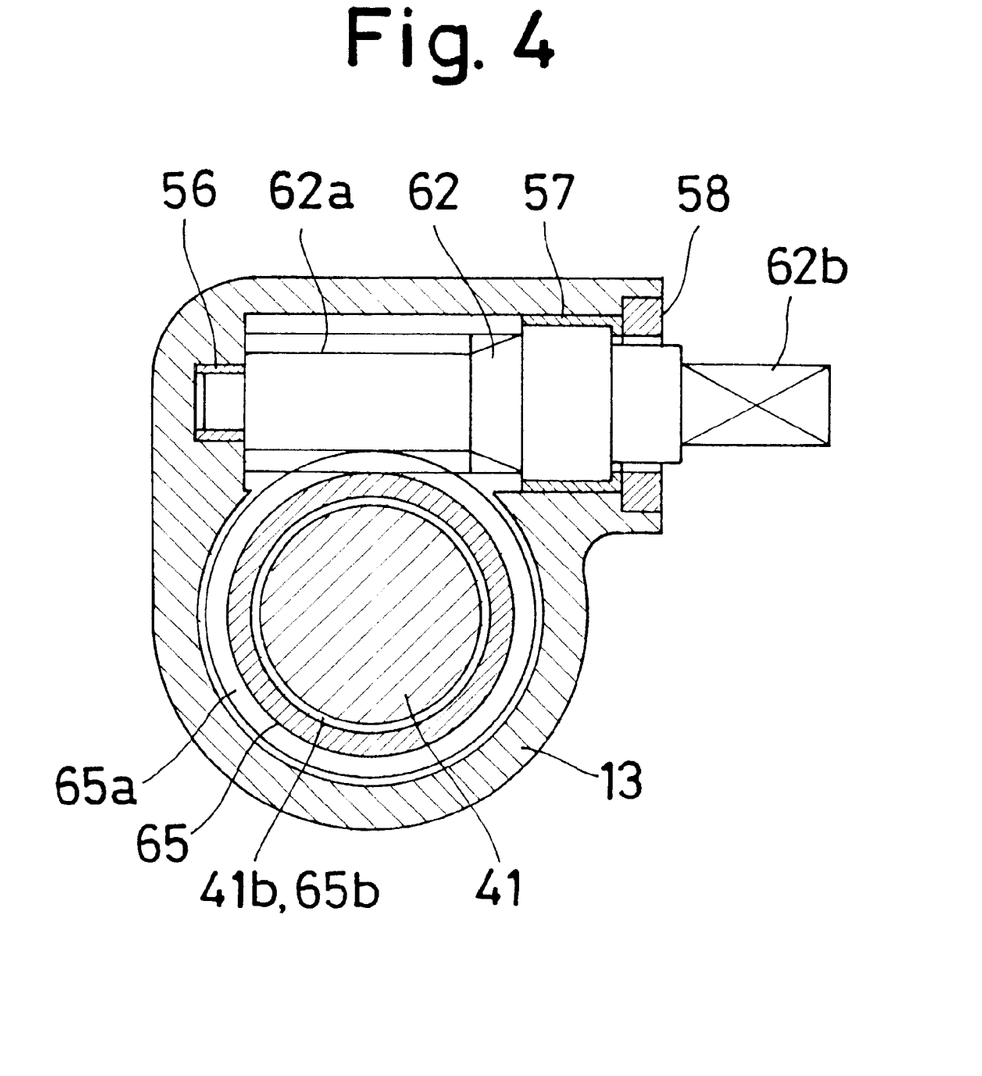
FIG. 4 is a cross sectional view taken along line B—B of FIG. 2.

In FIG. 2 and FIG. 3, the rear wheel steering apparatus 9 is mounted via a bracket 17 fixed to a first housing 11 so as to extend in the direction of a width of the vehicle. Namely, the rear wheel steering apparatus 9 extends perpendicular to the advance direction of the vehicle. In FIG. 2 and FIG. 3, the rear wheel steering apparatus 9 which is divided along line A—A is shown.

The brush-less motor 10 includes a coil 21 which is fixed to the first housing 11 while being insulated, a hollow shaft 31 which is rotatably supported by bearings 51 and 52 fixed to the first housing 11 and the second housing 12, a gear 32 formed on a right end portion of the hollow shaft 31 in a body, a magnet 22 fixed to an outer circumference of the hollow shaft 31 and the magnetic pole sensor D6 which detects the rotational angle of the hollow shaft 31.

The rotational torque of the hollow shaft 31 is transmitted to the planetary gear mechanism 33 via the gear 32. A carrier 33a of the planetary gear mechanism 33 which is located at the last stage is connected to a nut rotatably supported by a bearing 53 fixed to the first housing 11. The rotational torque of the hollow shaft 31 is amplified by the planetary gear mechanism 33 and is transmitted to the nut 34.

A trapezoid female screw 34a is formed on an inner circumference of the nut 34 and is threaded onto a trapezoid male screw 41a formed on the first rear wheel steering shaft 41. A male spline portion 41b which is formed on a right end portion of the first rear wheel steering shaft 41 is fitted into a female spline 65b formed on an inner circumference of a cylindrical member 65 50 as to be slidable in the axial direction (left and right direction in FIG. 2). Further, a worm wheel 65a formed on an outer circumference of the cylindrical member 65 is engaged with a worm 62a. The worm 62a is formed on a worm shaft 62 which is supported by bearings 56 and 57 fixed to a third housing 13. The worm wheel 65a and the worm 62a constitute a worm & wheel whose rotational efficiency is less than 0 (zero). In the normal condition of this worm & wheel, the first rear wheel steering shaft 41 is not able to relatively rotate with respect to the third housing 13.

Accordingly, when the nut 34 is rotated, the first rear wheel steering shaft 41 is not rotated and is moved in the axial direction.

A tie rod 43 having a ball joint 43a is fixedly threaded to the right end portion of the first rear wheel steering shaft 41. A tie rod 43 having a ball joint 43a is fixedly threaded to a right end portion of a second rear wheel steering shaft 42 which is fixedly threaded to the right end portion of the first rear wheel steering shaft 41. Further, the tie rods 43 are connected to knuckle arms (not shown) of the rear wheels WRL and WRR.

According to the above structure, the rotational torque of the hollow shaft 31 of the brush-less motor 10 is transmitted to the nut 34 through the planetary gear mechanism 33 and is converted into the axial propulsion force of the first rear wheel steering shaft 41 and the second rear wheel steering shaft 42 by the thread motion or screw motion of the trapezoid female screw 34a and the trapezoid male s crew 41a. Then, the converted axial propulsion force steers the rear wheels WRL and WRR via the tie rods 43.

Figure 5:
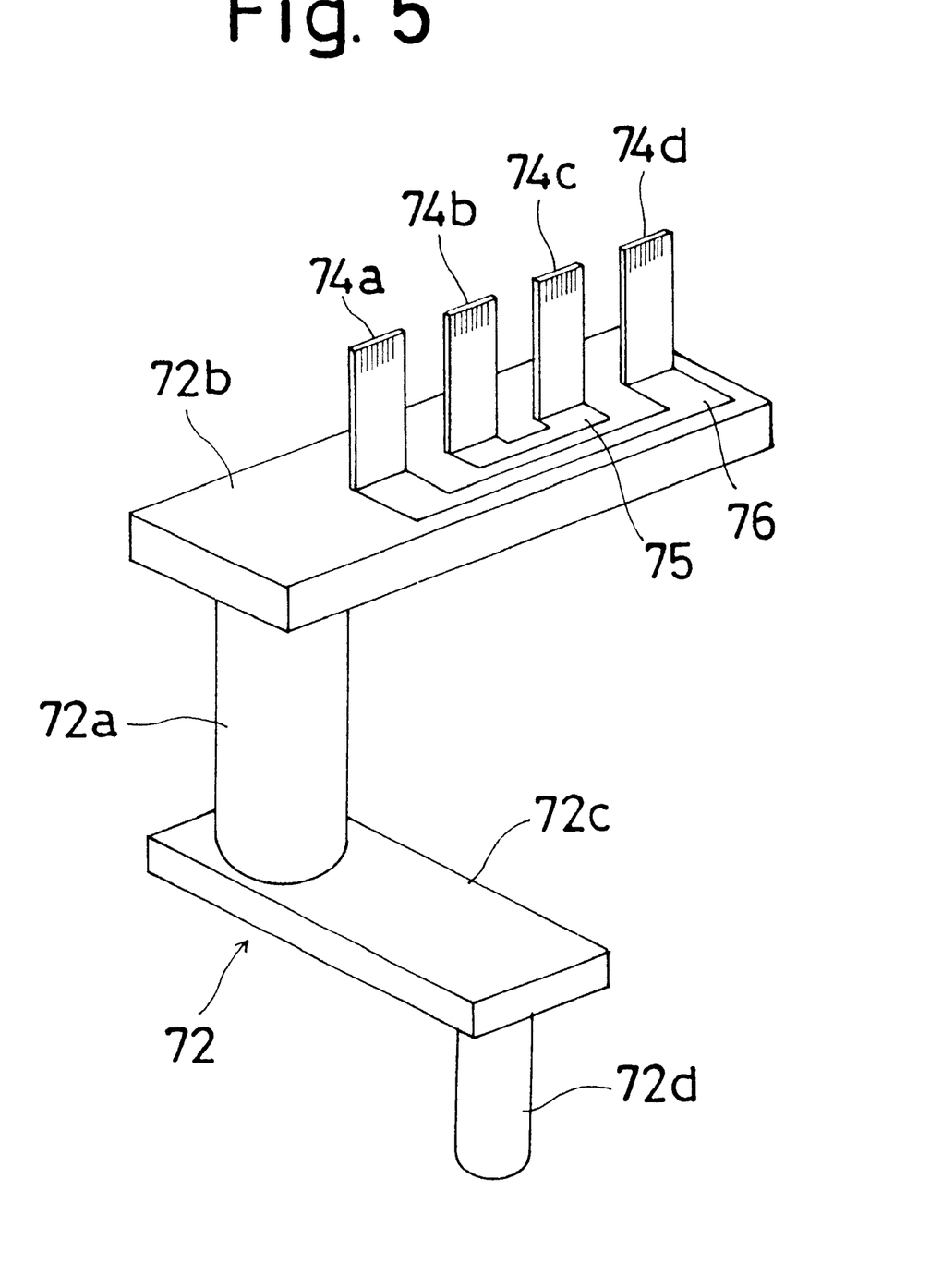
FIG. 5 is a perspective view showing a movable portion of a neutral position return sensor of a first embodiment of the rear wheel steering apparatus in accordance with the present invention.
Figure 6:
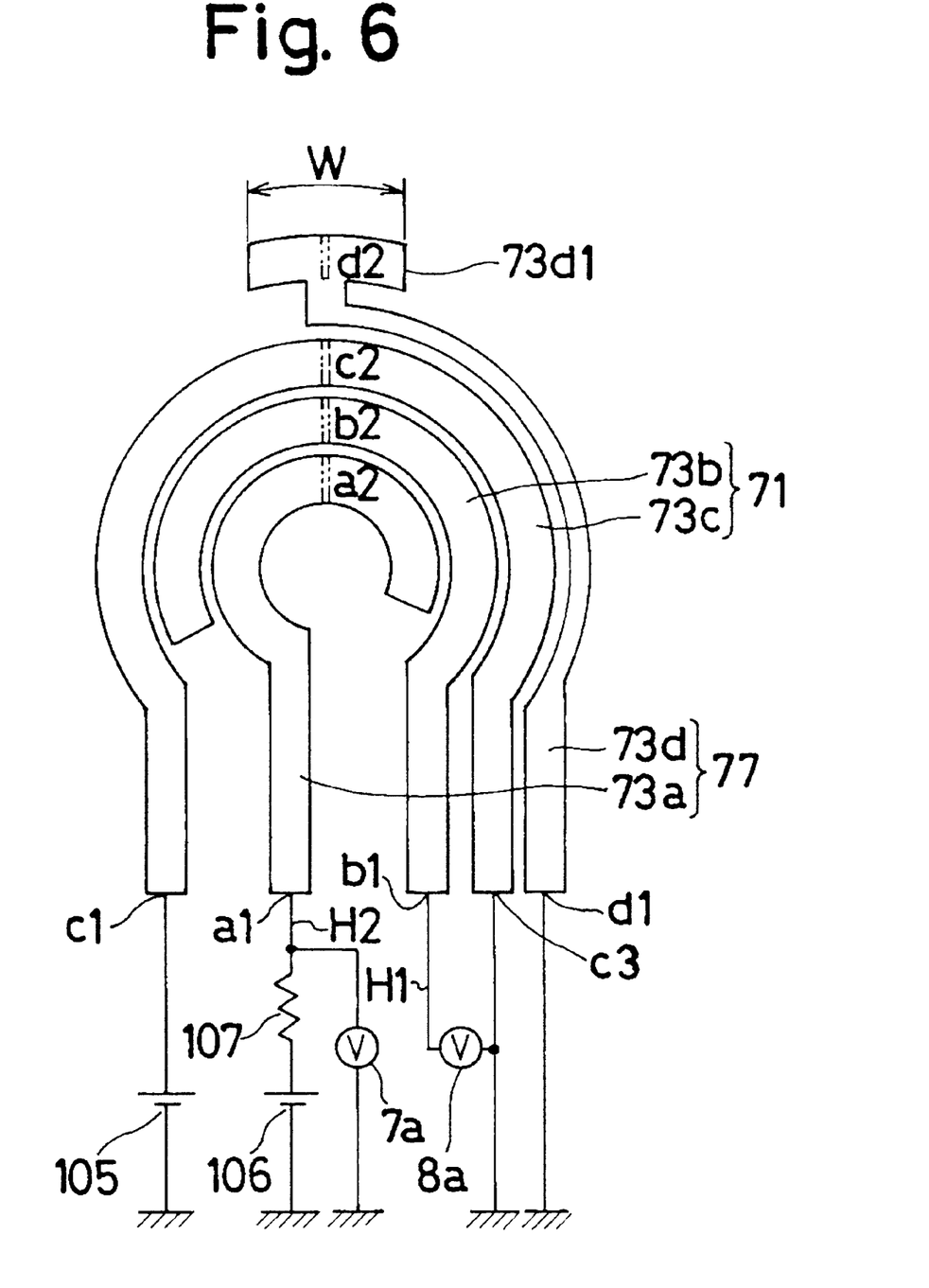
FIG. 6 is a plan view showing a wiring pattern of the neutral position return sensor of a first embodiment of the rear wheel steering apparatus in accordance with the present invention.

In FIGS. 3, 5 and 6, the steering angle sensor portion 70 includes a sensor movable portion 72 comprising an engaging portion 72d which engages with a groove 41c formed on the outer circumference of the first rear wheel steering shaft 41, a shaft portion 72a rotatably supported on a sensor housing of the rear wheel steering angle sensor 71, a connecting portion 72c connecting between the engaging portion 72d and the shaft portion 72a, an arm portion 72b fixed to an upper end portion of the shaft portion 72a at right angle to the shaft portion 72a and brushes 74a, 74b, 74c and 74d formed on the arm portion 72b in a body. The steering angle sensor portion 70 further includes a wiring pattern portion 73 having wiring patterns 73a, 73b, 73c and 73d on which the brushes 74a, 74b, 74c and 74d slide and which are formed at the sensor housing in a body so as to be opposite to the arm portion 72b. The arm portion 72b and the brushes 74a, 74b, 74c and 74d are insulated each other. The brushes 74a and 74d are connected electrically with each other via a conductive portion 76 and the brushes 74b and 74c are connected electrically with each other via a conductive portion 75.

Only the wiring pattern 73c of the wiring patterns 73a, 73b, 73c and 73d is made as a resistance member. The electric resistance of the resistance member of the wiring pattern 73c is thousands to tens of thousands times as many as the electric resistance of the wiring patterns 73a, 73b and 73d. Further, the electric resistance of the resistance member of the wiring pattern 73c is thousands to tens of thousands times as many as the electric resistance of the wiring pattern which is constituted by the brushes 74a and 74d and the conductive member 76. Further, the electric resistance of the resistance member of the wiring pattern 73c is thousands to tens of thousands times as many as the electric resistance of the wiring pattern which is constituted by the brushes 74b and 74c and the conductive member 75.

The brushes 74a, 74b, 74c and 74d slide on the wiring patterns 73a, 73b, 73c and 73d, respectively. The rear wheel steering sensor 71 is constituted by the wiring patterns 73b, 73c and the brushes 74b, 74c. The neutral position return sensor 77 is constituted by the wiring patterns 73a, 73d and the brushes 74a, 74d. In this first embodiment, the rear wheel steering angle sensor 71 and the neutral position return sensor 77 are formed in a body in the same senor housing.

As shown in FIG. 6, the wiring pattern 73b, 73c and the brushes 74b, 74c of the rear wheel steering angle sensor 71 are connected to an electric power source 105 and detecting portion 8a. The electric power source 105 and the detecting portion 8a are provided in the electric control device 8. Further, the wiring patterns 73a, 73d and the brushes 74a, 74d are connected to an electric power source 106, a resistance 107 and the detecting portion 7a.

The electric power source 106, the resistance 107 and the detecting portion 7a are provided in the neutral return notification device 7.

Accordingly, since the neutral return notification device 7 is directly driven by the battery 6 without via the electric control device 8 and the electric power source 106 of the central position return sensor 77 is different from the electric power source 105 of the rear wheel steering angle sensor 71, the operation of the neutral return notification device 7 is not affected even if the failure of the electric control device 8 occurs.

When the brush-less motor 10 is driven by the electric control device 8, the first rear wheel steering shaft 41 moves in the axial direction and the rear wheels WRL and WRR are steered. At this time, the engaging portion 72d which is engaged with the groove 41 formed on the outer circumference of the first rear wheel steering shaft 41 swings around an axial center of the shaft portion 72a and is accompanied by the axial movement of the first rear wheel steering shaft 41 and the arm portion 72b swings around the axial center of the shaft portion 72a in accompaniment of the swinging of the engaging portion 72d. Thereby, the brushes 74a, 74b, 74c and 74d slide on the wiring patterns 73a, 73b, 73c and 73d, respectively.

In this time, if the brush 74b is positioned at a position b2 on the wiring pattern 73b and the brush 74c is positioned at a position c2 on the wiring pattern 73c, the voltage drop between the positions ci and c2 on the wiring pattern 73c is detected as a voltage signal between the positions b1 and c3. This voltage signal shows the positions of the first and second rear wheel steering shafts 41 and 42 and shows the steering angle of the rear wheels WRL and WRR.

On the other hand, in case the first and second rear wheel steering shafts 41 and 42 stop at a position which is different from the neutral position due to the failure of the electric control device 8, the failure of the brush-less motor 10, the lock of the bearings 51, 52 and 53 and so on, a jack-handle (not shown) is installed on a two faces width portion 62b formed on a top end portion of the worm shaft 62 and the jack handle is rotated in order to return the rear wheels WRL and WRR to the neutral position.

When the worm shaft 62 is rotated by the jack-handle, the first rear wheel steering shaft 41 is rotated via the worm 62a formed on the worm shaft 62, the worm wheel 65a, the cylindrical member 65, the female spline portion 65b and the male spline portion 41b. Since the first rear wheel steering shaft 41 is rotated with respect to the nut 34 which is not able to rotate, the first rear wheel steering shaft 41 is moved in the axial direction.

Simultaneously, the engaging portion 72d swings around the axial center of the shaft portion 72a in accompaniment with the axial movement of the first rear wheel steering shaft 41 and the arm portion 72b swings around the axial center of the shaft portion 72a in accompaniment with the swinging of the engaging portion 72d. Thereby, the brushes 74a, 74b, 74c and 74d slide on the wiring patterns 73a, 73b, 73c and 73d, respectively.

At this time, if the brush 74a which constitutes the neutral position return sensor 77 is positioned at a position a2 on the wiring pattern 73a and the brush 74d is positioned at a position d2 on the wiring pattern 73d, the portion a1 of the wiring pattern 73a is grounded.

Thereby, in case the first and second rear wheel steering shafts 41 and 42 are positioned at positions different from the neutral position, namely, in case the rear wheels WRL and WRR are positioned at a position which is different from the neutral position, the detecting portion 7a detects always a predetermined voltage (High signal). On the other hand, in case rear wheels WRL and WRR are positioned at the neutral position, as mentioned above, the detecting portion 7a detects a ground signal, namely 0 volt signal (Low signal) and thereby it is detected that the rear wheels WRL and WRR are positioned at the neutral position. Then, on the basis of the Low signal from the detecting portion 7a, the neutral return notification device 7 notifies the operator who returns the rear wheels to the neutral position by voice, light and so on that the rear wheels were returned to the neutral position. Thereby, the rear wheels WRL and WRR are returned to the neutral position at the operator's first try.

The sliding distance W of a sliding portion 73d1 of the wiring pattern 73d on which the brush 74d slides is shorter than that of the other wiring patterns on which the other brushes slide. On the other hand, the sliding portion 73d1 has a predetermined width. Thereby, the inclination of the rear wheels WRL and WRR with respect to the back and forth direction of the vehicle which the driver does not have a feeling of wrongness is allowed.

Next, a second embodiment is described. In the second embodiment, the brushes 74b, 74c, the conductive portion 75, the wiring patterns 73a, 73d, the electric power source 106, the resistance 107 and the detecting portion 7a shown in FIGS. 5 and 6 are omitted. The neutral position return sensor is constituted by a magnet 82 fixed to the first rear wheel steering shaft 41 and a magnetic change detecting sensor 81 fixed to the third housing 13 and detecting the magnetic change accompanying the movement of the first rear wheel steering shaft 41. (Therefore, the magnet 82 and the magnetic change detecting sensor 81 are not included in the first embodiment.)

The magnetic change detecting sensor 81 is connected to the neutral return notification device 7. In the same manner as the first embodiment, the electric power source which drives the magnetic change detecting sensor 81 is different from the electric power source of the rear wheel steering angle sensor 71 and is provided in the neutral return notification device 7. Thereby, even if the failure of the electric control device 8 occurs, the operation of the neutral return notification device 7 is not affected.

Further, the signal being fed from the magnetic change detecting sensor 81 to the neutral return notification device 7 is always a predetermined voltage signal (High signal) when the rear wheels WRL and WRR are positioned at a position which is different from the neutral position. When the rear wheels WRL and WRR are positioned at the neutral position, the signal is a 0 volt signal (Low signal).

The principles, preferred embodiment and mode of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What we claim is:
1. A rear wheel steering apparatus comprising:
an electric motor for generating a rotational torque;
an electric control device for controlling the rotation of the electric motor;
a motion converting means for converting the rotational torque of the electric motor into a propulsion force in a direction of a width of a vehicle and connected to a rotational shaft of the electric motor;

an output shaft for outputting the propulsion force in the direction of the width of the vehicle which is converted by the motion converting means;

tie rods connecting between the output shaft and rear wheels and having a ball joint, respectively;

a housing fixed to the vehicle and accommodating the electric motor, the motion converting means and the output shaft therein;

a rear wheel steering angle detecting means for detecting a steering angle of the rear wheels steered by the output shaft;

a regulating member connected to the housing and for prohibiting the output shaft from rotating while allowing the output shaft to move in an axial direction;

a neutral return means for manually returning the rear wheels to a neutral position in the case of failure of the electric motor or the electric control device;

a neutral return detecting means for detecting return of the output shaft to the neutral position and;

a neutral return notification means for notifying the return of the output shaft to the neutral position.

2. A rear wheel steering apparatus according to claim 1, wherein the neutral return means includes a regulating member rotation means for manually rotating the regulating member with respect to the housing and the tie rods.

3. A rear wheel steering apparatus according to claim 1, wherein the rear wheel steering angle detecting means comprises a plurality of brushes and wiring patterns.

4. A rear wheel steering apparatus according to claim 1, wherein the neutral return means comprises a worm shaft rotatable through manual operation and a worm wheel engaging a worm of the worm shaft.

5. A rear wheel steering apparatus according to claim 1, wherein the neutral return notification means is connected to a battery and is not connected to the electric control device.

6. A rear wheel steering apparatus comprising:

an electric motor for generating a rotational torque;

an electric control device for controlling the rotation of the electric motor;

a motion converting means for converting the rotational torque of the electric motor into a propulsion force in a direction of a width of a vehicle and connected to a rotational shaft of the electric motor;

an output shaft for outputting the propulsion force in the direction of the width of the vehicle which is converted by the motion converting means;

tie rods connecting between the output shaft and rear wheels and having a ball joint, respectively;

a housing fixed to the vehicle and accommodating the electric motor, the motion converting means and the output shaft therein;

a rear wheel steering angle detecting means for detecting a steering angle of the rear wheels steered by the output shaft;

a regulating member connected to the housing and for prohibiting the output shaft from rotating while allowing the output shaft to move in an axial direction;

a neutral return means for manually returning the rear wheels to a neutral position in the case of failure of the electric motor or the electric control device;

a neutral return detecting means for detecting a return of the output shaft to the neutral position and;

a neutral return notification means for notifying the return of the output shaft to the neutral position;

wherein the neutral return detecting means is formed with the rear wheel steering angle detecting means in a body.

7. A rear wheel steering apparatus according to claim 6, wherein the neutral return means comprises a regulating member rotation means for manually rotating the regulating member with respect to the housing and the tie rods.

8. A rear wheel steering apparatus according to claim 6, wherein the neutral return means comprises a worm shaft rotatable through manual operation and a worm wheel engaging a worm of the worm shaft.

9. A rear wheel steering apparatus according to claim 6, wherein the neutral return notification means is connected to a battery and is not connected to the electric control device.

10. A rear wheel steering apparatus comprising:

an electric motor for generating a rotational torque;

an electric control device for controlling the rotation of the electric motor;

a motion converting means for converting the rotational torque of the electric motor into a propulsion force in a direction of a width of a vehicle and connected to a rotational shaft of the electric motor;

an output shaft for outputting the propulsion force in the direction of the width of the vehicle which is converted by the motion converting means;

tie rods connecting between the output shaft and rear wheels and having a ball joint, respectively;

a housing fixed to the vehicle and accommodating the electric motor, the motion converting means and the output shaft therein;

a rear wheel steering angle detecting means for detecting a steering angle of the rear wheels steered by the output shaft;

a regulating member connected to the housing and for prohibiting the output shaft from rotating while allowing the output shaft to move in an axial direction;

a neutral return means for manually returning the rear wheels to a neutral position in the case of failure of the electric motor or the electric control device;

a neutral return detecting means for detecting a return of the output shaft to the neutral position and;

a neutral return notification means for notifying the return of the output shaft to the neutral position;

wherein the neutral return detecting means is formed separately from the rear wheel steering angle detecting means.

11. A rear wheel steering apparatus according to claim 10, wherein the neutral return detecting means includes a magnetic member fixed to the output shaft and a magnetic change detecting sensor fixed to the housing and detecting the magnetic change accompanying the movement of the output shaft.

12. A rear wheel steering apparatus according to claim 10, wherein the neutral return means comprises a regulating member rotation means for manually rotating the regulating member with respect to the housing and the tie rods.

13. A rear wheel steering apparatus according to claim 10, wherein the neutral return means comprises a worm shaft rotatable through manual operation and a worm wheel engaging a worm of the worm shaft.

14. A rear wheel steering apparatus according to claim 10, wherein the neutral return notification means is connected to a battery and is not connected to the electric control device.

* * * * *